US008138923B2

(12) United States Patent
Grunwald et al.

(10) Patent No.: US 8,138,923 B2
(45) **Date of Patent: *Mar. 20, 2012**

(54) RFID SECURITY SYSTEM AND METHOD, INCLUDING SECURITY STAMP

(75) Inventors: Lukas Grunwald, South San Francisco, CA (US); Boris Wolf, South San Francisco, CA (US)

(73) Assignee: Neocatena Networks Inc., South San Francisco, CA (US)

( * ) Notice: Subject to any disclaimer, the term of this patent is extended or adjusted under 35 U.S.C. 154(b) by 346 days.

This patent is subject to a terminal disclaimer.

(21) Appl. No.: 11/796,260

(22) Filed: Apr. 27, 2007

(65) Prior Publication Data

US 2008/0100442 A1 May 1, 2008

Related U.S. Application Data

(60) Provisional application No. 60/855,511, filed on Oct. 31, 2006.

(51) Int. Cl.
*G08B 13/14* (2006.01)

(52) U.S. Cl. ............... 340/572.4; 340/572.1; 340/572.3; 340/539.13; 340/5.61; 340/10.1; 726/1; 726/4; 726/14; 726/22; 726/26; 713/155; 713/158

(58) Field of Classification Search ............... 340/572.1, 340/572.4, 539.13, 994, 572.3, 572.8, 572.9, 340/5.61, 5.82, 10.1; 235/375, 385; 713/153–158, 713/165, 175, 189; 709/248; 726/1–6, 14–17, 726/21–33; 380/28; 382/282; 326/8; 42/70.01
See application file for complete search history.

(56) References Cited

U.S. PATENT DOCUMENTS

| | | | | |
|---|---|---|---|---|
| 6,644,771 | B1 | 11/2003 | Silverbrook | |
| 7,161,489 | B2 | 3/2006 | Sullivan | |
| 2002/0005774 | A1 | 1/2002 | Rudolph et al. | |
| 2003/0212828 | A1 * | 11/2003 | Miyazaki et al. | 709/248 |
| 2005/0213755 | A1 * | 9/2005 | Daniels et al. | 380/38 |
| 2006/0055564 | A1 * | 3/2006 | Olsen et al. | 340/994 |
| 2006/0143439 | A1 * | 6/2006 | Arumugam et al. | 713/153 |

(Continued)

OTHER PUBLICATIONS

Juels et al., "The Blocker Tag: Selective Blocking of RFID Tags for Consumer Privacy", CCS '03 Oct. 27-30, 2003, Washington, DC, US.

(Continued)

*Primary Examiner* — George Bugg
*Assistant Examiner* — Sisay Yacob
(74) *Attorney, Agent, or Firm* — Courtney IP Law; Barbara B. Courtney

(57) ABSTRACT

Embodiments of an RFID security system and method are described herein. Embodiments include an RFID security server or appliance and RFID security software. In an embodiment, the RFID security server is placed between an RFID reader and an enterprise back-end. Thus the system operates at the point where the RFID data stream leaves the RF interface and enters a physical transmission medium before any other active components on the network (such as databases, middleware, routers). The RFID security server analyzes RFID tag data (including meta-data) received from the reader in-band and detects malware and errors in the data. RFID tag data containing malware or errors is blocked from entering the enterprise back-end. In an embodiment, analyzing RFID tag data includes generating a security stamp that is uniquely associated with the tag data. The security stamp is stored on the RFID tag, or alternatively, stored separately for later comparison in order to detect tampering.

36 Claims, 10 Drawing Sheets

U.S. PATENT DOCUMENTS

2006/0208857 A1 9/2006 Wong

OTHER PUBLICATIONS

Rieback, et al., "Is Your Cat Infected with a Computer Virus?" PerCom 2006, University of Texas, Arlington, US.
Internet page "What is RFDump" 2002 RFDump.org.
Form PCT/ISA/220, "PCT Notification of Transmittal of The International Search Report and the Written Opinion of the International Searching Authority, or the Declaration," 1 pg.
Form PCT/ISA/210, "PCT International Search Report," 3 pgs.
Form PCT/ISA/237, "PCT Written Opinion of the International Searching Authority," 7 pgs.

* cited by examiner

Tag Payload

| Adr | Tag-Memory-Example Malware | | | | | | | |
|---|---|---|---|---|---|---|---|---|
| 0x1 | 225c6672 | 6469745f | 6761745f | 73655f74 | 61646174 | 225c273b | 7264706f | 64207461 |
| 0x2 | 62617361 | 20656863 | 6961306e | 27320a3b | ffffffff | ffffffff | ffffffff | ffffffff |
| 0x3 | ffffffff | ffffffff | ffffffff | ffffffff | ffffffff | ffffffff | ffffffff | ffffffff |
| 0x4 | ffffffff | ffffffff | ffffffff | ffffffff | ffffffff | ffffffff | ffffffff | ffffffff |

FIG.4A

Translated Malware Command

| | | | | | | | | | | | | | | | | | | | | | | | |
|---|---|---|---|---|---|---|---|---|---|---|---|---|---|---|---|---|---|---|---|---|---|---|---|
| / | " | r | f | i | d | _ | t | a | g | _ | t | e | s | t | _ | d | a | t | a | \ | " | ; | ' |
| d | r | o | p | | d | a | t | a | b | a | s | e | | c | h | a | i | n | 0 | 2 | ' | ; | |

FIG.4B

RULE

FIG.4C C="/((\")|(\'))drop/ix"

Tag Payload

| Adr | Tag-Memory-Example Offline Signing | | | | | | | |
|---|---|---|---|---|---|---|---|---|
| 0x1 | 31303332 | 35343736 | 3938725f | 69665f64 | 61745f67 | 65747473 | 645f7461 | 5f617270 |
| 0x2 | 646f6375 | 5f74756e | 626d7265 | 785f7a79 | 32313433 | 000affff | ffffffff | ffffffff |
| 0x3 | ffffffff | ffffffff | ffffffff | ffffffff | ffffffff | ffffffff | ffffffff | ffffffff |
| 0x4 | ffffffff | ffffffff | ffffffff | ffffffff | ffffffff | ffffffff | ffffffff | ffffffff |
| 0x5 | ffffffff | ffffffff | ffffffff | ffffffff | ffffffff | ffffffff | ffffffff | ffffffff |
| 0x6 | ffffffff | ffffffff | ffffffff | ffffffff | ffffffff | ffffffff | ffffffff | ffffffff |
| 0x7 | ffffffff | ffffffff | ffffffff | ffffffff | ffffffff | ffffffff | ffffffff | ffffffff |
| 0x8 | ffffffff | ffffffff | ffffffff | ffffffff | ffffffff | ffffffff | ffffffff | ffffffff |
| 0x9 | ffffffff | ffffffff | ffffffff | ffffffff | ffffffff | ffffffff | ffffffff | ffffffff |
| 0xa | ffffffff | ffffffff | ffffffff | ffffffff | ffffffff | ffffffff | ffffffff | ffffffff |
| 0xb | ffffffff | ffffffff | ffffffff | ffffffff | ffffffff | ffffffff | ffffffff | ffffffff |
| 0xc | ffffffff | ffffffff | ffffffff | ffffffff | ffffffff | ffffffff | ffffffff | ffffffff |
| 0xd | ffffffff | ffffffff | ffffffff | ffffffff | ffffffff | ffffffff | ffffffff | ffffffff |
| 0xe | ffffffff | ffffffff | ffffffff | ffffffff | ffffffff | ffffffff | ffffffff | ffffffff |
| 0xf | ffffffff | ffffffff | ffffffff | ffffffff | ffffffff | ffffffff | ffffffff | ffffffff |

FIG.7

Tag Payload

Tag-Memory-Example Offline Signing

| Adr | | | | | | | | |
|---|---|---|---|---|---|---|---|---|
| 0x1 | 31303332 | 35343736 | 3938725f | 69665f64 | 61745f67 | 65747473 | 645f7461 | 5f617270 |
| 0x2 | 646f6375 | 5f74756e | 626d7265 | 785f7a79 | 32313433 | 000affff | ffffffff | ffffffff |
| 0x3 | ffffffff | ffffffff | ffffffff | ffffffff | ffffffff | ffffffff | ffffffff | ffffffff |
| 0x4 | ffffffff | ffffffff | ffffffff | ffffffff | ffffffff | ffffffff | ffffffff | ffffffff |
| 0x5 | ffffffff | ffffffff | ffffffff | ffffffff | ffffffff | ffffffff | ffffffff | ffffffff |
| 0x6 | ffffffff | ffffffff | ffffffff | ffffffff | ffffffff | ffffffff | ffffffff | ffffffff |
| 0x7 | ffffffff | ffffffff | ffffffff | ffffffff | ffffffff | ffffffff | ffffffff | ffffffff |
| 0x8 | ffffffff | ffffffff | ffffffff | ffffffff | ffffffff | ffffffff | ffffffff | ffffffff |
| 0x9 | ffffffff | ffffffff | ffffffff | ffffffff | ffffffff | ffffffff | ffffffff | ffffffff |
| 0xa | ffffffff | ffffffff | ffffffff | ffffffff | ffffffff | ffffffff | ffffffff | ffffffff |
| 0xb | ffffffff | ffffffff | ffffffff | ffffffff | ffffffff | ffffffff | ffffffff | ffffffff |
| 0xc | ffffffff | ffffffff | ffffffff | ffffffff | ffffffff | ffffffff | ffffffff | ffffffff |
| 0xd | ffffffff | ffffffff | ffffffff | ffffffff | ffffffff | ffffffff | ffffffff | ffffffff |
| 0xe | ffffffff | ffffffff | ffffffff | ffffffff | ffffffff | ffffffff | ffffffff | ffffffff |
| 0xf | ffffffff | ffffffff | ffffffff | ffffffff | abb3d210 | 75605302 | 7e9ad4d3 | b4b6b210 |

Security Stamp

FIG.8

Manipulation

Tag Payload

| Adr | Tag-Memory-Example Offline Signing | | | | | | | |
|---|---|---|---|---|---|---|---|---|
| 0x1 | 31303332 | 35343736 | 3938725f | 69665f64 | 61745f67 | 65747473 | 645f7461 | 5f617270 |
| 0x2 | 646f6375 | 5f74756e | 626d7265 | 785f7a79 | 32313533 | 000affff | ffffffff | ffffffff |
| 0x3 | ffffffff | ffffffff | ffffffff | ffffffff | ffffffff | ffffffff | ffffffff | ffffffff |
| 0x4 | ffffffff | ffffffff | ffffffff | ffffffff | ffffffff | ffffffff | ffffffff | ffffffff |
| 0x5 | ffffffff | ffffffff | ffffffff | ffffffff | ffffffff | ffffffff | ffffffff | ffffffff |
| 0x6 | ffffffff | ffffffff | ffffffff | ffffffff | ffffffff | ffffffff | ffffffff | ffffffff |
| 0x7 | ffffffff | ffffffff | ffffffff | ffffffff | ffffffff | ffffffff | ffffffff | ffffffff |
| 0x8 | ffffffff | ffffffff | ffffffff | ffffffff | ffffffff | ffffffff | ffffffff | ffffffff |
| 0x9 | ffffffff | ffffffff | ffffffff | ffffffff | ffffffff | ffffffff | ffffffff | ffffffff |
| 0xa | ffffffff | ffffffff | ffffffff | ffffffff | ffffffff | ffffffff | ffffffff | ffffffff |
| 0xb | ffffffff | ffffffff | ffffffff | ffffffff | ffffffff | ffffffff | ffffffff | ffffffff |
| 0xc | ffffffff | ffffffff | ffffffff | ffffffff | ffffffff | ffffffff | ffffffff | ffffffff |
| 0xd | ffffffff | ffffffff | ffffffff | ffffffff | ffffffff | ffffffff | ffffffff | ffffffff |
| 0xe | ffffffff | ffffffff | ffffffff | ffffffff | ffffffff | ffffffff | ffffffff | ffffffff |
| 0xf | ffffffff | ffffffff | ffffffff | ffffffff | abb3d210 | 75605302 | 7e9ad4d3 | b4b6b210 |

Security Stamp

FIG.9

RFID SECURITY SYSTEM AND METHOD, INCLUDING SECURITY STAMP

RELATED APPLICATIONS

This application claims priority from U.S. Provisional Patent Application No. 60/855,511, titled "RFID Security System", filed Oct. 31, 2006, which is incorporated by reference in its entirety herein. This application is related to copending U.S. patent application Ser. No. 11/796,409, entitled RFID Security System and Method, filed Apr. 27, 2007.

TECHNICAL FIELD

Embodiments described herein are related to radio-frequency identification (RFID) tags, particularly to systems and methods for detecting malicious manipulation of RFID tags.

BACKGROUND

Radio-frequency identification (RFID) is an automatic identification method, relying on storing and contactlessly retrieving data remotely using devices called RFID tags or transponders. An RFID tag is an object that can be attached to or incorporated into a product, animal, or person for the purpose of identification using radio waves. Chip-based RFID tags contain silicon chips and antennas. The use of RFID tags is becoming commonplace for tracking products from a manufacturing site, through the supply chain, to the consumer. RFID tags carry information useful for inventory management, location tracking, theft prevention and more. However, RFID tags provide a potential avenue of attack for anyone wishing to disrupt the intended function of a tag, even causing serious undesirable consequences to larger systems. For example, it is possible to infect an RFID tag with a virus that is passed on to a back-end system when the RFID tag is read. The paper "Is Your Cat Infected with a Computer Virus?" (M. R. Rieback, et al., Vrije Universiteit Amsterdam, PerCom2006) describes creating a self-replicating RFID virus that uses RFID tags as a vector to compromise back-end middleware systems, for example via a SQL injection attack.

FIG. 1 is a block diagram of a prior art system 100 including a radio-frequency identification (RFID) tag reader 102. An RFID tag being read by the reader 102 includes malware 103. As used herein, malware includes specifically tailored or modified RFID tag data designed to infiltrate or damage a system without the owner's informed consent. As such, malware may include any manipulation of or addition to the intended RFID data, including viruses, worms, Trojan horses, and data that may be valid but incorrect (for example data identifying a box of ammunition as fishing tackle). The system 100 is typical of enterprise systems such as warehouses or retail that include an enterprise back-end consisting of one or more databases or enterprise applications 110, 112 and 114 that store, for example, one ore more enterprise applications. The back-end communicates with the external world via one or more networks and also employs one or more middleware servers 106 for this purpose. In addition, there may be any number of communication routes from the back-end to the external world, such as one or more edge servers 108.

The reader 102 is coupled to a reader control unit 104. The control unit may be integrated into the reader itself (tight coupling) or a separate server controlling one or more readers (loose coupling). When the RFID tag and its malware 103 are read, the tag data and malware 103 are passed to the middleware server 106. The middleware server 106 communicates the tag data and malware 103 to the back-end, where the malware 103 is free to infect any back-end system databases 110, 112, or 114 susceptible to this specific attack.

RFID tags, in addition to being potential virus carriers, are vulnerable to manipulation by persons wishing to alter the data on the tags for various reasons. There are many undesirable implications to making an RFID tag look "correct" while conveying incorrect information. For example, RFID tags on contraband material may be altered to make the material appear as non-contraband material.

Some vendors currently use proprietary encryption schemes to protect RFID tag data from unauthorized read or write access. However, this does not necessarily prevent malicious alteration of RFID tag data. Also, some of the encryption schemes in use are weak due to the limited storage and processing capabilities present on RFID tags. Some of these encryption schemes have already been broken. In addition, some groups concerned with individual privacy rights have been working on methods for preventing RFID tags from being read by RFID readers in an individual's environment. Such methods operate on the RF interface, for example to block or scramble signals. However, methods operating over the air do not lend themselves to complex and feature-rich solutions for RFID security as there is no obvious transmission medium where a gatekeeper could be placed. Attempting to manage RFID security via the wireless RF interface poses potentially unmanageable technical difficulties.

There is an unaddressed need for a system and method that minimizes the likelihood of infection of larger systems by malware carried into the system on RFID tags. There is also a need for a system and method that addresses malware and also facilitates RFID system audit capability, including escalation and documentation of malware detection incidents. Furthermore, there is an unaddressed need for a system and method using simple security stamps to manage RFID tag data integrity without applying complex data encryption schemes which are difficult to manage and require considerable storage space.

BRIEF DESCRIPTION OF THE DRAWINGS

FIG. 4A is a block diagram of RFID tag data including malware in the payload, according to an embodiment.

FIG. 4B is a block diagram of a decoded malware command from RFID tag data of FIG. 4A (here assuming ACSCII encoding), according to an embodiment.

FIG. 4C is an illustration of a policy rule, according to an embodiment.

FIG. 7 is a block diagram of RFID tag data, according to an embodiment.

FIG. 8 is a block diagram of RFID tag data including an associated signature, according to an embodiment.

FIG. 9 is a block diagram of manipulated RFID tag data, according to an embodiment.

Figure 1:
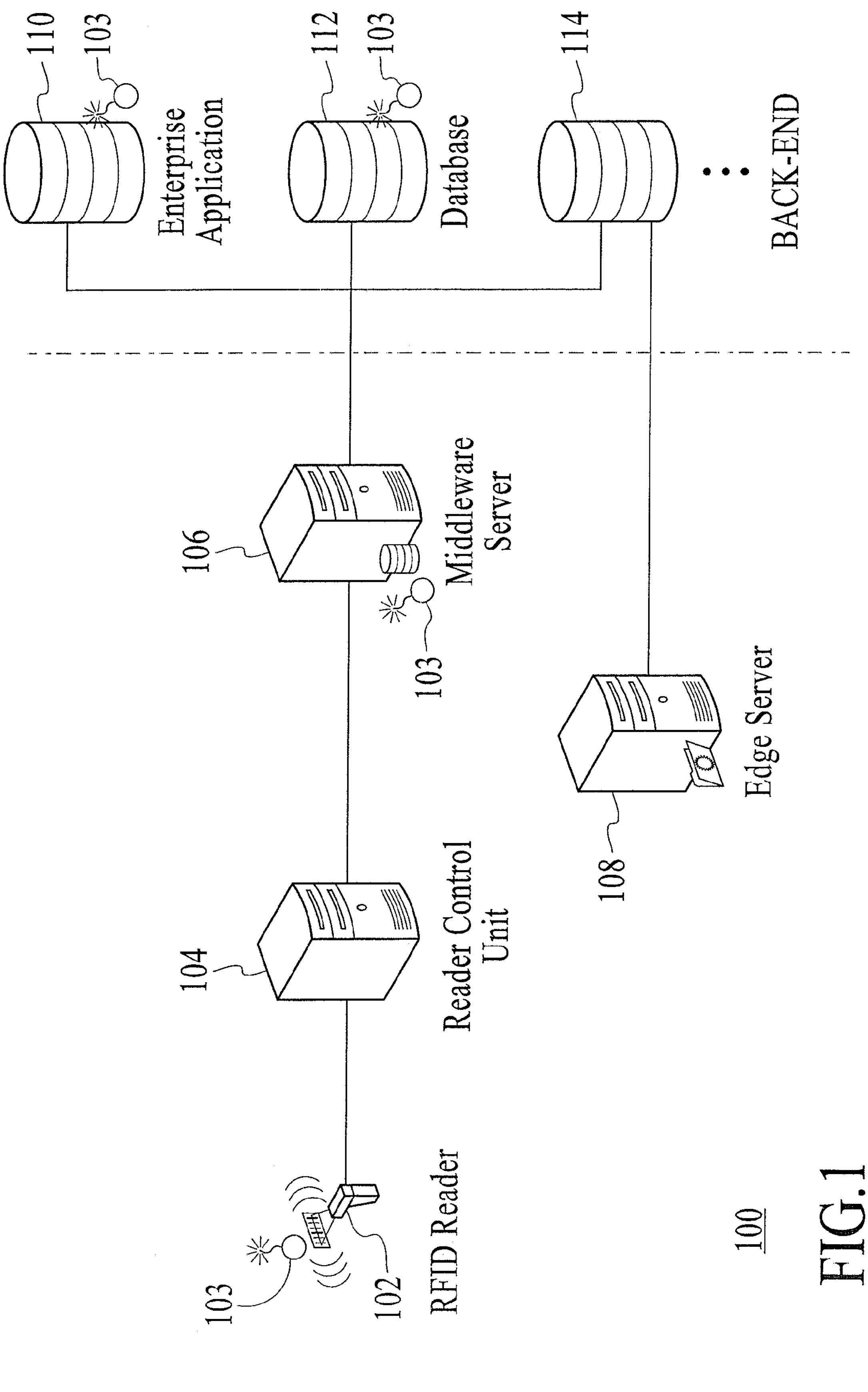
FIG. 1 is a block diagram of a prior art system including a radio-frequency identification (RFID) tag reader.

In the drawings, the same reference numbers identify identical or substantially similar elements. To easily identify the discussion of any particular element or act, the most significant digit or digits in a reference number typically to the figure number in which that element is first introduced (e.g., element 110 is first introduced and discussed with respect to FIG. 1).

DETAILED DESCRIPTION

Embodiments described herein include an RFID security server or appliance and RFID security software. In an embodiment, the RFID security server is placed between an RFID reader and a back-end. Thus the system operates at the point where the RFID data stream leaves the RF interface and enters a physical transmission medium before reaching any other active components on the network, such as databases, middleware, routers, etc.

The RFID security server analyzes RFID tag data (including meta-data) received from the reader in-band and detects malware and errors in the data. RFID tag data containing malware or errors is blocked from entering the enterprise back-end. Unwanted RFID tags are also identified and filtered as noise. In various embodiments, an audit database stores history information related to the RFID tag data analysis. In an embodiment, the RFID tag data analysis is performed according to policies that can be tailored to a particular enterprise. The policies may govern how the analysis is performed, how malware and error detection incidents are stored in the audit database, and whether and how malware and error detection incidents are escalated within the enterprise. In various embodiments, the security server also generates a security stamp based on the RFID tag data. The security stamp is unique to the given RFID tag data and may be used to verify data integrity. When the RFID tag with the security stamp is received at another security server in another location, the other security server can determine whether the RFID tag data or the security stamp has been manipulated since the security stamp was initially generated. For example, in an embodiment, the other security server generates the security stamp again using the RFID tag data and compares the newly generated security stamp with the original one. If the two security stamps do not match, this is an indication that the RFID tag data or the security stamp has been compromised.

Embodiments of the invention are designed to interoperate with RFID tags (also referred to herein as "tags"). The basic unit of information handled by an embodiment is all data stored in the memory of a single tag, also referred to herein as RFID tag data, or tag data. Typically, a tag is attached to a tangible real-world object. The tag data includes identification (ID) information that identifies the manufacturer of the tag itself, the object type or category, and a unique serial number identifying the particular object (e.g. product, animal or person) the tag is concerned with. Depending on the tag type and the application there may be additional storage capacity for additional data such as arbitrary business data. The additional data may be encrypted or protected by a key. Manufacturer ID, product ID and serial number should be read-only data that is preset by the manufacturer of the RFID tag. The additional data can be read-only or writable. Alternatively, write access could be password protected.

Figure 2:
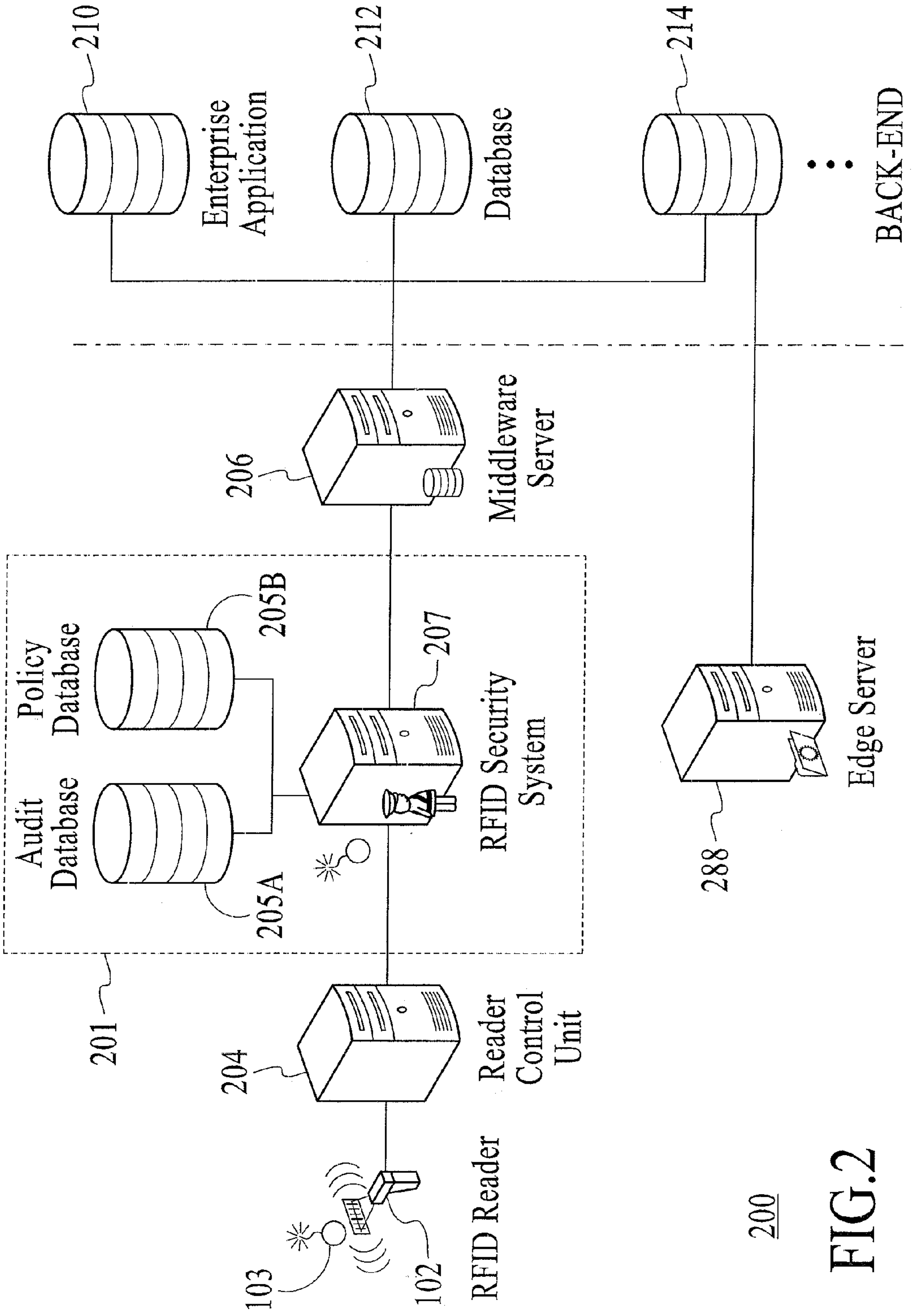
FIG. 2 is a block diagram of an RFID security system, according to an embodiment.

FIG. 2 is a block diagram of an RFID security system 200, according to an embodiment. The system 200 includes a back-end system including multiple databases 210, 212, and 214. The back-end system can be an enterprise system such as a warehouse or retail location, but embodiments are not so limited. As used herein, "enterprise" implies any entity with one or many physical locations that employs RFID tags and RFID readers and uses RFID tag data for any purpose. For example, the back-end system could be part of a supply-chain that uses RFID tags to establish and maintain control of product distribution. The back-end system communicates with the external world via one or more servers such as edge server 208 and middleware server 206. An RFID security system 201 is located between the middleware server 206 and an RFID reader control unit 204. No tag data may go past the reader control unit 204 to the middleware server 206 (and on to the back-end system) without first passing through the RFID security system 201.

RFID tags are read by the reader 202. The reader 202 interacts with the RFID tag through radio transmission. The reader 202 uses an antenna to emit an electromagnetic field at a specified frequency. If the tag is placed within reach of the field the tag is activated and as a result the tag and the reader 202 can communicate. Some tags are passive, in that they do not include their own power supply but are rather powered by the field of the reader 202. The reader 202 may send an arbitrary number of commands to the tag to read or write data inside the memory of the tag, or to authenticate the reader to the tag with a supplied password.

To communicate with the back-end system (in this case through the reader control unit 204), the RFID reader uses an industry standard interface such as RS-232, Ethernet, USB, PC-Card etc. The reader control unit 204 includes corresponding driver software that hides the low-level communications implementation details and provides a high-level application programming interface (API) as a set of functions to control the reader 202. In a typical transaction a command is transmitted to the reader 202 (e.g. to read a specific data cell from the tag's memory) and the response from the tag is returned as a result.

The RFID reader 202 abstracts and therefore simplifies the communication with the RFID tag. Typically, the RFID reader 202 auto-detects the RFID tag type (e.g., manufacturer and product) and handles any non-standard communication features required for a particular tag transparently. The RFID reader 202 represents a consistent interface to different kinds of RFID tags and facilitates communication using different protocols.

In the example of FIG. 2, the tag being read includes malware 203. The tag data with the malware 203 arrives at the RFID security system 201, which includes a security server 207 and one or more databases 205.

As further explained below, the databases 205 include an audit database 205A and a policy database 205B, but embodiments are not so limited. In various embodiments, components of the RFID security system may be distributed in any of the known ways, such as over one or more networks of various types, and may include any number of distributed computing or database components that together perform the functionality described and claimed herein.

The security server analyzes the tag data according to one or more policies accessed from the policy database 205A. The policies are completely flexible and configurable as may be desired or required by a particular enterprise. The policies include rules according to which the tag data is analyzed to detect malware. The policies can further include directions for storing audit information in the database 205A, such as tag analysis history. The policies can further include directions for escalating malware detection incidents for immediate action by a person, etc. In the example of FIG. 2, the malware 203 is detected by the security server 207, and the RFID tag data is blocked from passing on to the middleware server 206. The malware 203 never enters the back-end system, including any of the databases 210, 212, or 214.

Figure 3:
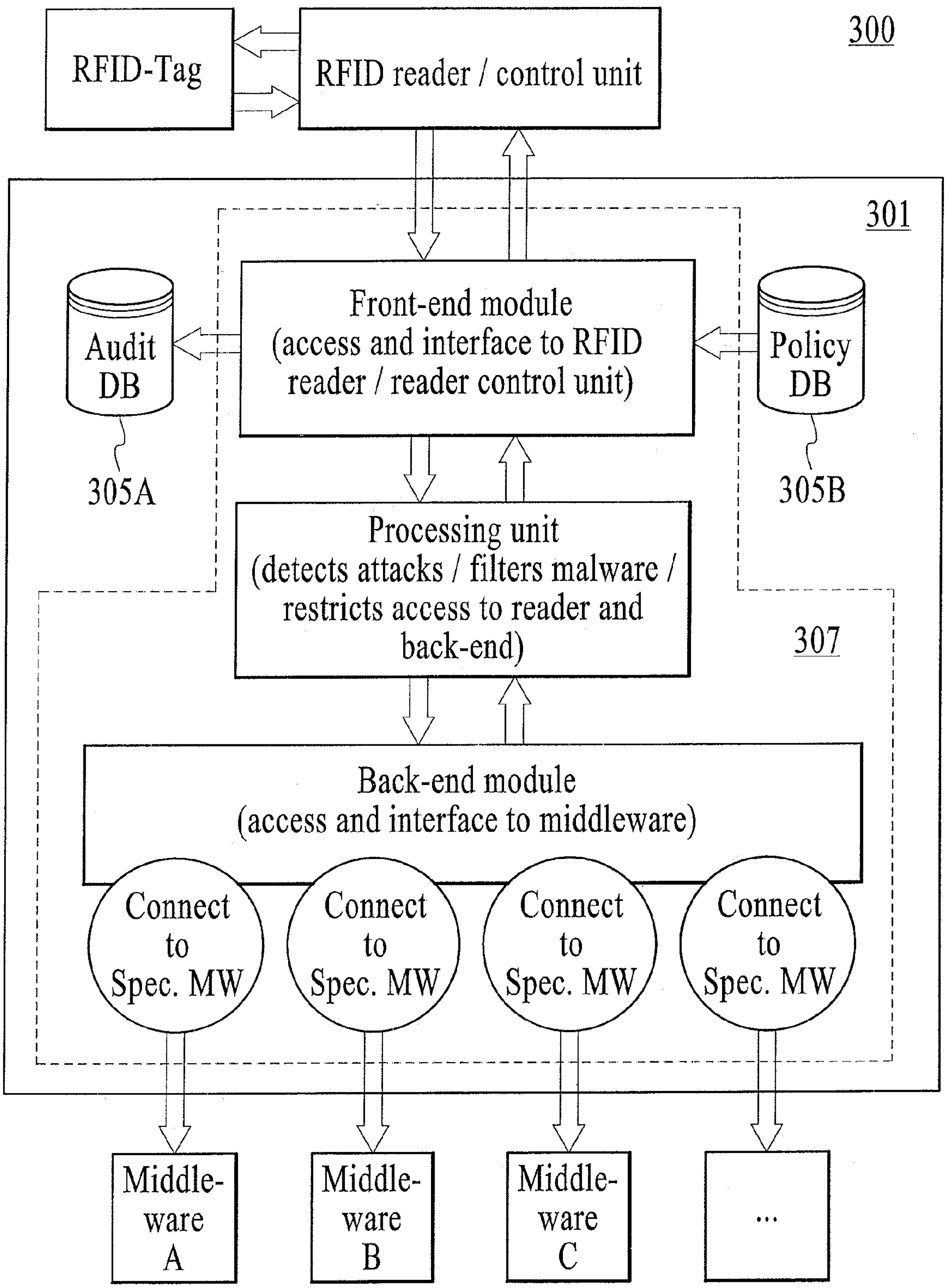
FIG. 3 is a block diagram of an RFID security system, according to an embodiment.

FIG. 3 is a block diagram of a system 300, including an RFID security system 301, according to an embodiment. The RFID security system 301 includes an RFID security server 307 and databases 305A and 305B.

The RFID security system 301 is positioned between an RFID reader (which is the interface to RFID tags such as the RFID tag shown), and various types of back-end systems via connections to various specific middleware. For example, back-end systems may include an IBM™ system, a Sun™ system, a SAP™ system, or a Microsoft™/Biztalk system, but embodiments are not so limited.

An embodiment detects and filters malicious contents such as RFID worms and viruses, and detects manipulated RFID tag contents. These and other types of manipulations could be a result of fraud or error. In addition, it is possible to limit the type and contents of acceptable RFID data by means of a black-and-white-list used to control the acceptance of specific RFID data and meta-data to the supply-chain back-end systems. An embodiment separates and protects the potentially vulnerable back-end of a given RFID supply chain from the RFID reader hardware that is processing RFID tags (e.g., individually or in bulk on a container or pallet).

An embodiment detects predefined malware patterns, and is used to enforce specific data formats as defined by a policy database (policy DB) 305B. Invalid tag data and meta-data is identified, filtered and documented, and relevant incidents may be escalated. It is possible to trigger specific actions depending on the type of RFID data and meta-data detected. An embodiment integrates existing off-the-shelf RFID back-end solutions and existing RFID reader hardware through seamless modular connectors, which transparently mimic the original RFID supply chain element they replace. From the middleware's perspective, an embodiment acts like the RFID reader. From the RFID reader's perspective, an embodiment acts like the standard software interface into the middleware. This additional layer of indirection creates the ability to analyze and act upon the RFID tag data before it reaches the back-end.

In an embodiment, the RFID security system 301 is an embedded hardware appliance providing different functions in a modular fashion. Each module provides a distinct logical block of functionality that can be audited and certificated individually through a standardized software interface. Different modules of functionality can be chained together sequentially so that the output of one module becomes the input for the next. The choice of modules and the order in which they are chained together, along with the configuration of the individual modules, determines the behavior of the RFID security system 301 for incoming RFID tag data and meta-data contents.

The RFID security server 307 includes a front-end module that receives inbound RFID tag data and meta-data. The front-end module is capable of dealing with the full variety of RFID tag types in the marketplace. Off-the-shelf RFID reader devices can simplify this task greatly but cannot eliminate complexity entirely. The front-end module is coupled to a processing unit, the central unit of the system described herein, which includes the logic to detect malware attacks, restrict access to RFID tag data, and control the RFID reader. Because of its direct exposure to the outside world, the front-end module is particularly hardened against potential attacks that could be transposed via a manipulated RFID tag.

One function of the front-end module is to control vendor-specific RFID readers. In an embodiment, there are different front-end modules for different types of RFID reader hardware. Each front-end module controls the reader's read/write functionality through a vendor specific or ISO standard RFID command set. Depending on the reader hardware's capabilities the front-end module can perform either reading of individual tags or bulk reading of several RFID tags in parallel.

Various embodiments contain several software components to check and validate communication between the RFID reader and the back-end. These components are configured for the specific needs of a particular client (e.g., an enterprise) installation or application of the RFID security system. It is this configuration that determines the system's behavior. In an embodiment, the configuration information is stored in the form of rules in the policy database. Rules in the policy database 305B may reference signatures of attack patterns stored in the policy database 305B or another database.

An example of a policy rule is: "Deny all tag data with malware containing SQL injection attacks. Furthermore, when such an attack is detected, submit a log entry into the audit database 305A and escalate an event to the appropriate recipients (e.g. email to system administrator)."

There are many different types of SQL injection attacks and many variations of each type of attack. In an embodiment, the actual bit patterns of specific attacks are not hard coded into the policy rule itself. Rather, the rule references a set of related attack signatures or attack signature patterns stored in the policy database 350B or a separate attack signature database (not shown) collocated with the security server 307 or accessible to the security server 307. Over time the knowledge base of known attack signatures grows as new attacks are discovered and documented. In an embodiment, an attack signature database is equipped with a mechanism to download attack signature updates from a central repository on a regular basis.

The policy database 350B is pre-configured with a complete rule set chosen from a selection of predefined standard rule sets during setup of the RFID security system. At the same time the standard rule set can be adjusted arbitrarily to meet individual client or application-specific needs. In a normal operation mode the policy database 350B is strictly read-only and cannot be modified. If the policy database 350B is to be changed intentionally, e.g. to reflect new traffic patterns, the normal processing flow of incoming requests between the front-end and the back-end is suspended, so that the processing unit can never accidentally enter an inconsistent state due to a temporary inconsistency in the policy database 350B itself. If all changes to the policy database 350B have been applied and committed, normal execution resumes and new requests are processed according to the updated policy database 350B.

An embodiment of the RFID security system 301 mediates between one or more back-end applications and a multitude of different RFID readers and types. This leads to a situation where n*m different configurations are considered, assuming n back-end applications expecting to interface with m different types of RFID tags.

In an embodiment, a policy creation application enables an administrator of the RFID security system 301 to configure its processing unit on different levels of granularity from coarse to fine. An embodiment is configured using a graphical user interface (UI) and a set of standard policies for a standard usage scenario. To fine tune the configuration, individual policies are altered on a very low level through a text-based interface. Using this interface an administrator has full control over all possible parameters (e.g. tag types) and can customize behavior of the security system according to specific use cases. In an embodiment, a text-based interface exposes the internal encoding of rules inside the policy database 350B using RFRL (RF Rule Language) syntax.

Using this syntax, a rule may have the following encoding:

DENY UDF DETECT SIGNATURE "drop database" LOG ESCALATE The grammar of the RFRL language in Backus-Naur-Form (BNF) is as follows:

```
        ( ACCEPT | DENY | DROP ) ( UDB | ADB )
        ( EPC "range_or_pattern" |
SIGNATURE { 0x<offset> } "<signature reference>" |
PATTERN { 0x<offset> }
"<attack pattern>" | VALIDATE "<encoding reference>" )
{ LOG {PRIORITY}} {
ESCALATE {PRIORITY}}
```

The individual elements have the following semantic meaning:

ACCEPT—If the rule is matched the tag is accepted.

DENY—If the rule is not matched the tag is rejected and the back-end is notified.

DROP—If the rule is not matched the tag is dropped silently. To the back-end it seems like the tag never reached the reader.

UDB—The rule applies to the user data block of the tag.

ADB—The rule applies to the administrative data block.

EPC—Specifies a range or pattern of Electronic Product Codes (EPCs).

SIGNATURE—References an attack signature or an attack signature pattern inside the attack signature database, the attack signature identifier is enclosed in double quotes.

PATTERN—Instead of referencing an attack signature or a set of related attack signatures inside the attack signature database, the PATTERN predicate is followed by the attack signature itself hard-coded into the policy rule. Note, that the pattern may contain regular expressions.

PATTERN and SIGNATURE may be followed by an optional starting address 0x<offset> in hexadecimal notation. For example 0xA0 means that the signature must be located at address 0xA0. When omitted the signature may be located at any address inside the tag data block.

VALIDATE—Validates the data against a specific data type or encoding (e.g. XML, ASN.1 etc.). Note, that some data types may be specified further. For example XML data might be further specified by a DTD or XML Schema. ASN.1 might be further specified by DER, XER or PER encoding.

LOG—If the rule matches place a log entry into the Audit Database. This term is optional. The logging details are configured separately. The optional PRIORITY parameter assigns a priority to the log entry.

ESCALATE—If the rule matches escalate the event to the appropriate recipients. This term is optional. Who to escalate to and how is configured separately. The optional PRIORITY parameter assigns a priority to the even escalation.

The rules to be evaluated for a given RFID tag are retrieved from the policy database 350B. Together, all rules involved in deciding whether to accept or reject a given RFID tag form the processing unit of the RFID security system 301. Not every rule must be evaluated for a specific setup or RFID tag. In an embodiment, the relevant rules are evaluated sequentially as further described below.

As soon as a DROP or DENY rule matches or a ACCEPT rule does not match the evaluation process is aborted and the tag rejected. Only if the entire chain of rules applies (all DROP and DENY rules do not match and all ACCEPT rules do match) the tag is accepted and forwarded to the back-end system.

If a RFID tag is classified as rejected or denied by the processing unit, this event may be logged in the audit database 305A. The back-end client system then either receives an error result indicating the reason for the rejection (DENY) or the event is silently discarded (DROP), so the back-end client does not notice an invalid tag has been encountered. This behavior is configurable using the rules in the policy database 350B.

A tag classified as accepted is granted access and routed to the back-end, which results in the back-end receiving and processing the tag data. On the contrary, any write access initiated by the back-end to the tag may be checked by the processing unit for validity as well, and rejected or modified if the write access is not classified as accepted.

In an embodiment, the audit database 305A stores results from the processing unit's decisions in a separate database with special protection against manipulation. The audit database 305A enables the RFID security system 301 to prove to third parties the correct working of the RFID supply chain. The audits are written to the audit database 305A depending on the type of detection incident or violation as defined in the policy database 350B and enforced by the processing unit. Key events required to be reported and stored in the audit database 305A are defined by the policy database 350B. In an embodiment, an audit report is generated using third-party data warehouse analysis software or database-queries directly against the audit database 305A.

If no specific rules are defined, all malware detections and violations are logged by the audit database 305A. To secure the audit database 305A against outside manipulation, all fields inside the audit database 305A are time-stamped and cryptographically hashed. If the audit database 305A reaches its storage capacity limit, the system will stop until the database space is adjusted to a new acceptable storage space level or an administrator has decided to clear or archive stored events. A notification message is generated as soon as the audit database 305A capacity reaches a configurable threshold. The audit database 305A can operate on any standard SQL database, e.g. an Open Source product such as PostgreSQL or MySQL. Alternatively, interfaces into propriety databases like Oracle™, Microsoft SQL Server™ or IBM DB2™ may be used.

Examples of rules and use cases are described in the following subsections in greater detail. The following rules and use cases are examples only and do not limit the scope of the disclosure or the scope of the claimed invention in any way.

Data Format Validation

This type of rule can be used to validate if the data area of a RFID tag conforms to a specific data format or encoding scheme. If validation against a known data format is successful it is more likely the tag data can be processed by the back-end successfully. Possible acceptable data formats could be XML or ASN.1, for example. Some data types may be specified further. For example, XML data might be further qualified by a DTD or XML Schema. ASN.1 might be further qualified by DER, XER or PER encoding. If the data does not conform to the expected data format the tag is rejected. This type of rule may also be applied to information flow in the opposite direction when the back-end is writing data back to the RFID tag. In this scenario the RFID security system helps to prevent invalid data from being written to the tag.

Example:

ACCEPT UDB VALIDATE "ware_house_dtd"

In this example the identifier "ware_house_dtd" references a Data Format Record inside the policy database 350B. In addition to the data type itself (in this case XML) the data format record may also further qualify the data type (in this case a DTD).

Malware Detection

This type of rule is conceptually similar to the Data Format Validation rule, but emphasizes semantic checks of the data. This type of rule prevents specially prepared RFID tags from exploiting known vulnerabilities in the back-end such as buffer overflow or SQL injection attacks. Such tags typically contain a syntactically correct data area, but the actual data contains semantic inconsistencies targeting specific bugs in the back-end software. When semantically incorrect data is detected a tag is typically rejected. Known attack patterns are stored in the policy database or in a separate attack signature database which can be configured to be updated with the latest attack signatures on a regular basis.

Example:

DROP UDF DETECT SIGNATURE "sql injection" LOG ESCALATE

In this example the user data area is scanned for all signature patterns stored in the attack signature database under the name "sql injection". In case a given tag checks positive for SQL injection attacks it will be dropped. An event will be escalated and logged in the audit database.

EPC Pattern Filter

This type of rule handles tags containing an EPC (Electronic Product Code). The rule can be used to classify tags according to a subset or range of allowed or forbidden EPCs. These black or white lists of EPC codes or ranges of them are stored in the signature database. Regular expressions may be used to describe arbitrary EPC patterns.

Example:

DENY ADB EPC "21[0-9]*" LOG

This rule denies all tags having EPCs starting with "21".

EPC Manager Filter

Each product shipped with an RFID tag containing an EPC should be registered in the designated EPC Manager, a publicly accessible database containing all valid EPCs issued by the manufacturer of the product. Such databases can be queried by the RFID security system for validity of an encountered RFID tag and based on the result of the query accepted or rejected.

Tag Type Filter

Access to certain RFID tags can be granted or rejected based on tag type. This includes matching for manufacturer ID, product ID or matching the serial number to a list of ranges, as well as limiting access to certain types of RFID tags, such as tags from specific vendors, tags operating at a specific frequency or tags conforming to specific industry standards such as ISO 15693 or ISO 14443.

Controlling RFID Information Flows

It may be desirable to control access on a more granular level. For example it could be desirable to grant or reject access only to different types or areas of information stored inside the tag's data area. This can be used to prevent the back-end from reading certain information from the tag or preventing the back-end from modifying certain information.

In addition it is also possible to modify the information read from the tag while it traverses the RFID security system before it reaches the back-end. The same level of control is possible for information flow in the reverse direction: Data sent by the back-end may be arbitrarily modified by the RFID security system before it is written to the tag.

Policy Enforcement

After the tag has been processed by a defined sequence of rules like the ones described previously it is classified as accepted or rejected (positive or negative). While a positively classified tag is generally allowed to be processed by the back-end, behavior of the RFID security system for negatively classified tags is determined by this component. Possible reactions to rejected tags include:

1. No special action, which handles the tag as if positively classified.

2. Issue a warning to the back-end or a third party software system that a tag was classified as negative, but still allowing access to the tag.

3. Generating an error for the back-end, so the client knows that a tag was blocked by the RFID security system and not allowing access to the tag.

4. Silently discarding any access to the tag so that the back-end never learns about the presence of the tag.

When the processing unit is finished processing the RFID data and meta-data, and the content has been approved by the current policy and does not match any malware patterns, the data is forwarded to the outbound back-end module. This module connects the RFID security system 301 with existing and future RFID middleware solutions like Microsoft BizTalk Server™ for RFID, SUN Microsystems™ Sun Java™ System RFID Software or WebSphere RFID Premises Server™. This connection can be established via a direct cable link using TCP/IP socket based communication or by means of providing a fitting middleware interface for any other RFID middleware system.

The various modular connectors to specific middleware, in various embodiments, are vendor-specific software modules that allow connection to any middleware or other RFID system by providing the correct connection and language-set being used. Using a meta-language, such as the Simple RFID Middleware Protocol, embodiments of the RFID security system allow easy implementation or out-of-the-box connections to most of the middleware solutions existing in the marketplace today. Connectors for not-currently-supported, or future middleware solutions are implemented by building on standard interfaces and data formats.

As further described below, an embodiment includes multiple instances of the RFID security system 301 communicating with each other. Various instances can communicate remotely from various locations in a distributed environment. For example, in a supply chain scenario one RFID security system appliance is installed at a central warehouse location while several similar appliances are each installed at a retail store location. In an embodiment, the distributed group of appliances communicates among themselves using standard Internet connections and encryption protocols. In an embodiment, the appliance located at the warehouse generates a security stamp by calculating a cryptographic hash over outgoing RFID tag data. Once the goods arrive at their destination, the local appliances can recalculate the cryptographic hash over incoming RFID tag data and compare it against what has been transmitted earlier from the warehouse to determine whether the tag data has been manipulated in any way. This makes it possible to determine whether the tagged goods actually arrive at the designated location. Additionally, if the data has been tampered with in route, this can be detected without having to transmit the tag data itself to a receiving back-end system.

FIG. 4A is a block diagram of RFID tag data including malware in the payload, according to an embodiment. The RFID tag data includes binary example tag payload data in hexa-decimal notation for address range 0x10-0x4F. This kind of data is found, for example, on a standard 13.56 MHz ISO 15693 RFID tag.

FIG. 4B is a block diagram of a decoded malware command from RFID tag data of FIG. 4A, according to an embodiment. Assuming ASCII encoding, the section indicated in FIG. 4A reads as shown in FIG. 4B. Because appropriate decoding is used, a potentially malicious command becomes visible: “drop database”. If this command were to reach a back-end SQL database, and was executed there with the necessary privileges, a database could be deleted with potentially catastrophic consequences. For example, complete failure of the supply chain system could result until the database is restored. In some scenarios permanent data loss could result. This example highlights the risk of introducing malware into the back-end systems by exposing a specifically tailored RFID tag to an RFID reader.

FIG. 4C is an illustration of a policy rule that addresses the example malware above, according to an embodiment. An instance of an RFID security system as described herein includes a policy rule R with the following condition C as illustrated in FIG. 4C. This example condition is written as a regular expression. Regular expressions are an information technology technique used to describe string pattern matching constructs in a concise and compact manner. In this example, the regular expression translates to, “match any data that contains a single or double quote followed by the word ‘drop’”. If the tag from the example above passes the system, then rule R would obviously match and as a result the tag data could be dropped and an event be escalated.

The complete rule in RFRL could look like this:

DROP UDB PATTERN “/(\")|(\'))drop/ix” LOG ESCALATE

The condition in this example is just one very specific example set out for the purpose of describing embodiments, and is not intended to be limiting. For example, many other scenarios applicable to embodiments are considerably more complex.

Figure 5:
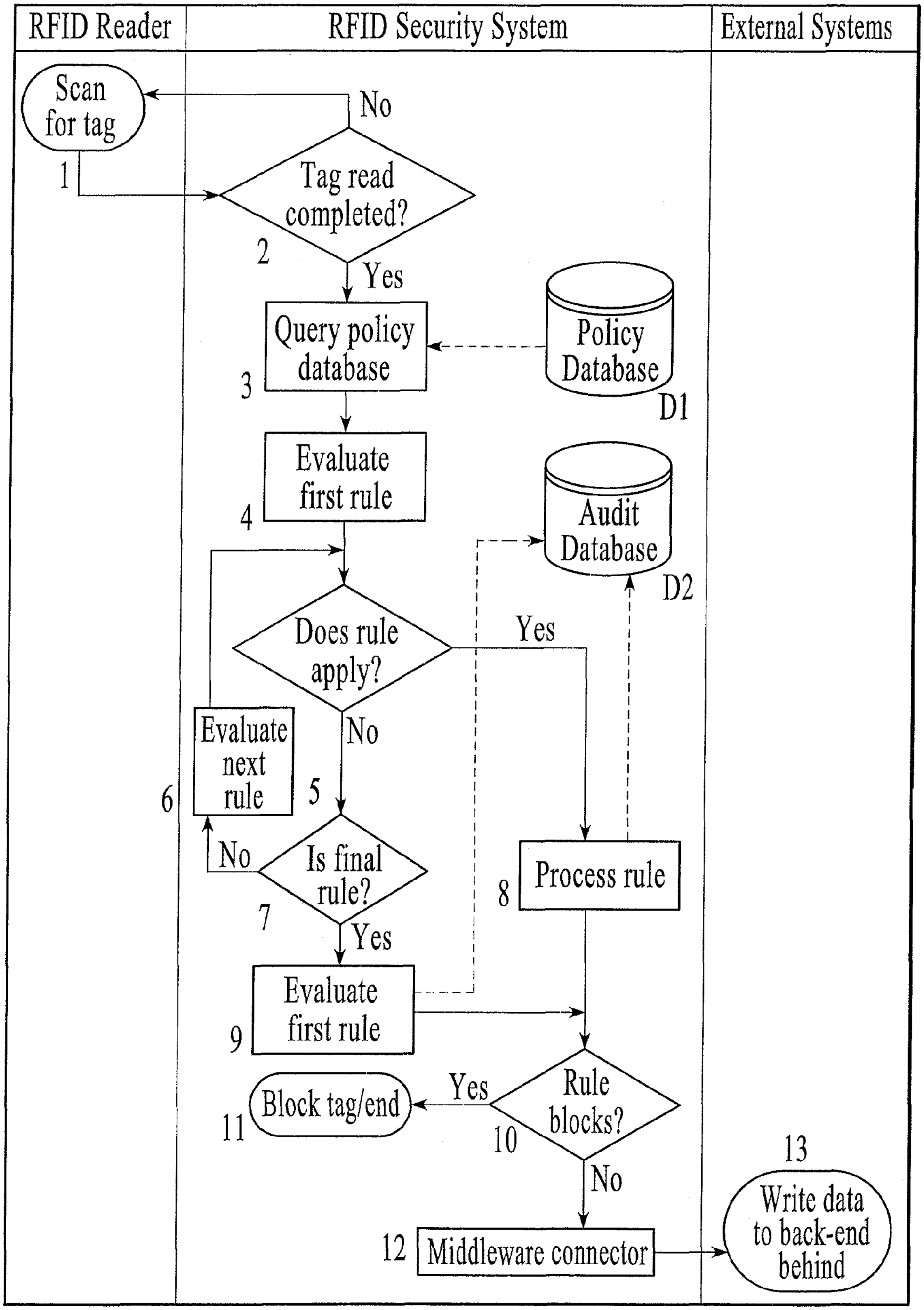
FIG. 5 is a flow diagram of an RFID security method, according to an embodiment.

FIG. 5 is a flow diagram of an RFID security method that is implements by the systems and components previously described herein, according to an embodiment. The numbered paragraphs below describe similarly numbered elements of FIG. 5.

1. An RFID reader is scanning for RFID tags or transponders in range.

2. If a tag T is located in the reader field, the reader will read the tag identifier Tid (e.g. Electronic Product Code EPC) and the tag data TD. RFID tags come in many shapes and sizes but they all have in common that they carry a unique identifier and a user data block of varying length. Typically, the tag data TD consists of a consecutive block of binary data that can be addressed for reading and writing in chunks of 4 or 8 bytes (for example TD0x00-TD0xFE to address 1 kilobyte of data in chunks of 4 bytes). As soon as reading of the tag is complete, the tag data TD and the tag identifier Tid are passed to the RFID security system 3. The RFID security system reads the appropriate sequence of rules SR from the policy database 350B D1 and loads it into its processing memory. SR consists of one or more rules R1, R2, . . . , Rn.

4. Consider: SR=R1->R2-> . . . ->Rn. The system evaluates the first rule R1. This (and every) rule consists of a condition C (simple or complex) and one or more actions A1, A2, . . . , An. The system attempts to match the rule against the tag by testing its condition C against the tag data TD (user data and/or meta-data).

5. R=C, A1, A2, . . . , An. If the tag data TD meets the rule’s condition C the rule is considered a match and processing will continue with (8). If the rule does not match processing will continue with (7).

6. The system evaluates the next rule Ri. This (and every) rule consists of a condition C (simple or complex) and one or more actions A1, A2, . . . , An. The system attempts to match the rule against the tag by testing its condition C against the tag data TD (user data and/or meta data). The system continues with (5).

7. If there are still rules in SR that have not been evaluated yet the next rule Ri will be processed in (6). Otherwise the system continues with (9).

8. The system processes the rule R that was matched in the prior element by executing the associated actions A1, A2, . . . , An. For example, actions may initiate a log entry into the auditing database, initiate an event escalation, or mark the tag for blocking or filtering. The system continues with (10).

9. This point is only reached if none of the rules R1, . . . , Rn in SR match the tag. In this case the system evaluates the default rule Rdef. This rule has no condition and matches any tag. As a result, the action commands A1, A2, . . . , An defined by the default rule will be executed. For example, action commands may initiate a log entry into the auditing database, initiate an event escalation, or mark the tag for blocking.

10. If the tag T has been marked for blocking in either (8) or (9) the system continues with (11), otherwise the system continues with (12).

11. Processing for tag T ends here. Because the tag has been marked for blocking its contents will be discarded and never reach the back-end. The system continues with (2).

12. The system forwards the tag data TD to the middle-ware connector.

13. The middle-ware connector forwards the tag data TD to the associated back-end systems. The system continues with (2).

Figure 6:
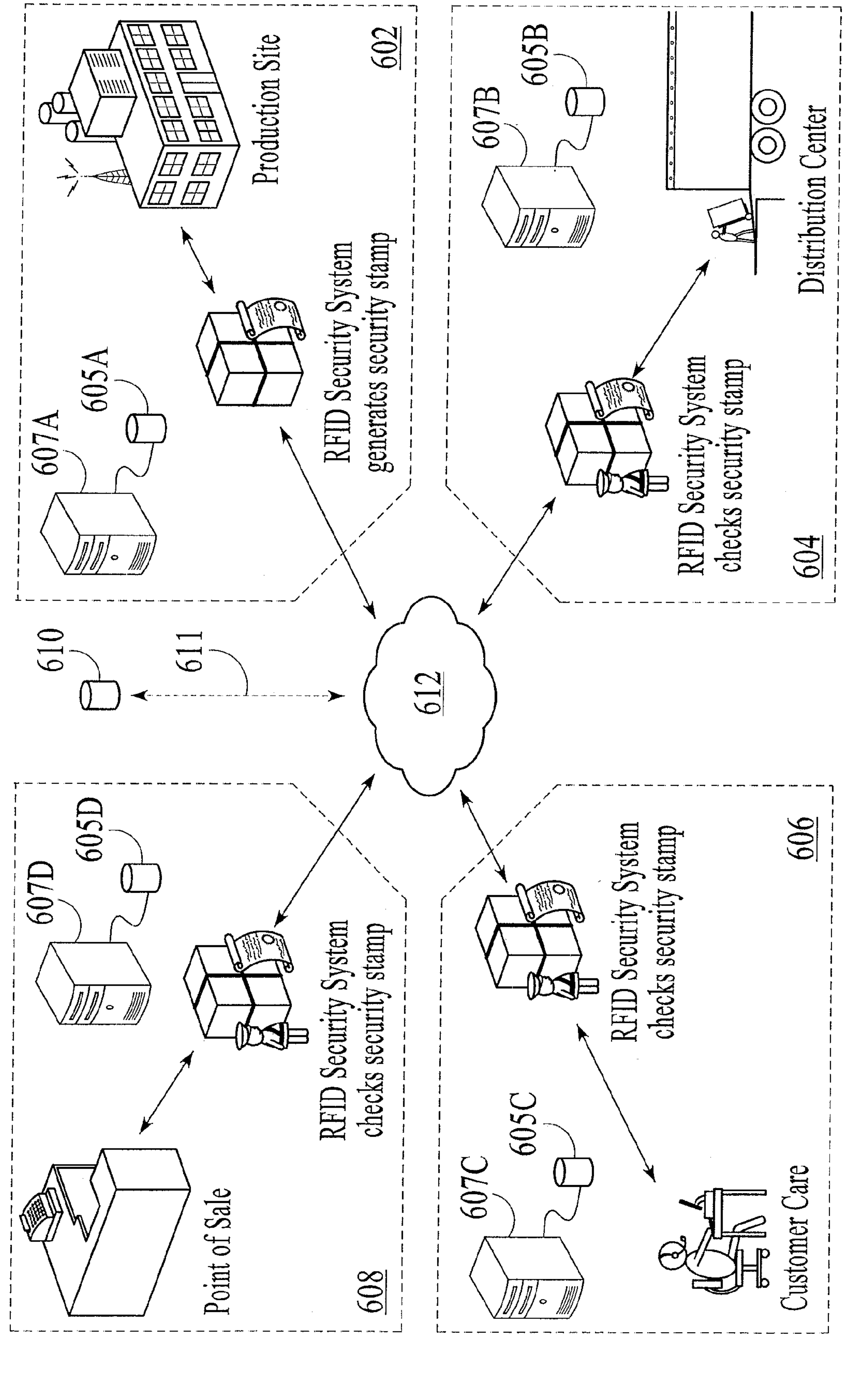
FIG. 6 is a block diagram of an RFID security system including multiple instances of security servers, according to an embodiment.

FIG. 6 is a block diagram of an RFID security system 600 including multiple instances of security servers 607, according to an embodiment. As previously described multiple instances of security servers in various embodiments communicate with each other via one or more networks. In addition, multiple instances of security servers in various embodiments implement a method of creating security stamps over RFID data that has been analyzed and found to be secure (free of malware and errors). The embodiment proves RFID tag data and meta data integrity in transit. A first instance of a security system reads the RFID tag data and creates the security stamp. The security system reading the tag is equivalent to physical presence of the tag and associated item in proximity to the security system. At a later point in time a second instance of the security system reads the same tag, recalculates the security stamp and compares this new security stamp with the original security stamp. If the security stamps are not identical this proves that the tag data has been tampered with in transit as a result of fraud or error. In an embodiment, to create the security stamp for the tag, standard cryptographic algorithms are applied, for example hash-based message algorithm code-message digest five (HMAC-MD5) or hash-based message algorithm code-secure hash algorithm one (HMAC-SHA-1) in combination with a secret shared key. The security stamp can be stored either directly on the tag (also referred to as offline mode) or in a shared database, for example using virtual private network (VPN) technology (also referred to as online mode). Offline mode is usually the preferred method if allowed by RFID tag memory size.

The system 600 is an example of a distributed network for a supply chain that include a production site 602, a distribution center site 604, a customer care site 606, and a point of sale site 608. The sites 602, 604, 606 and 608 are coupled via one or more wired or wireless networks, including but not limited to local area networks (LANs), wide area networks (WANs), the Internet, and virtual private networks (VPNs). Each of sites 602, 604, 606 and 608 include a respective security system 607A-607D. Each of security systems 607A-607D is coupled to respective one or more databases 605A-605D. The databases 605A-605D represent local or distributed databases that provide any or all of the database functions previously described including but not limited to an audit database function, an attack signature database function, and a policy database 350B function. In addition, as described further below, each of the security systems 607 is optionally coupled to a database 610 via a VPN 611. In an embodiment, database 610 is a central security stamp database used to store security stamps generated from specific RFID data and associated uniquely with the specific RFID tags. Alternatively, the security stamps are written to the specific RFID tag itself. In an embodiment, a security stamp is created by the security system 607A at the production site. Thereafter, the security stamp can be read by any of the other sites, either from the database 610 (online mode), or from the RFID tag (offline mode). The database can be safely accessed using VPN technology. The security stamp provides a mechanism to easily determine whether the RFID tag data, metadata, or security stamp has been manipulated. This determination is easily made before assuming the risk of receiving the RFID tag data into the back-end system of any of the sites 604, 606 or 608.

FIG. 7 is a block diagram of RFID tag data that is used to illustrate security stamp generation, according to an embodiment. In this example, the tag payload is 54 bytes long and can be found at address 0x00 through 0x0D. The RFID security system applies the standard HMAC-MD5 algorithm to calculate a security stamp using the shared secret key "ncntestkey". The resulting security stamp consists of 16 bytes of data and reads:

abb3d210756053027e9ad4d3b4b6b210

The RFID security system can store this security stamp in an online database such as database 610. Alternatively, the security stamp can be written back into the RFID tag if there are at least 16 bytes of free memory available not required by the application's payload. In this case there is plenty of free memory, therefore the security system writes the security stamp to the tag.

FIG. 8 is a block diagram of RFID tag data including an associated security stamp, according to an embodiment. Typically security stamp generation occurs when the tag (and the item it is physically attached to) leave a warehouse or logistics center such as site 602. The tag passes a RFID reader and the security system (such as security system 607A) reads the tag, calculates the security stamp and writes it back to the tag as shown in the diagram.

FIG. 9 is a block diagram of manipulated RFID tag data, according to an embodiment. Let us assume an attacker attempts to change the data on the tag of FIG. 8 while in transit. This is technically not difficult. All the attacker needs is suitable RFID reader hardware and a software program such as RFDump (see for example, "RF-ID and Smart-Labels: Myth, Technology and Attacks", L. Grunwald, Black-Hat Briefings, Las Vegas, 2004). With reference to FIG. 9, in this example the attacker changed one byte from "34" to "35".

When changing the payload data the attacker would need to adjust the security stamp as well. However, without knowing the secret key "ncntestkey" there is no way for the attacker to recalculate the security stamp over the modified payload. Therefore, the attacker leaves the security stamp untouched. Even if the attacker modified the security stamp, this modification would still be detected by the security system as further described below.

When the tag reaches its destination, e.g. distribution site 604, a second instance of the security system (e.g., security system 607C) sees the tag and its contents. The security system reads the security stamp from the tag and also recalculates the security stamp over the (now modified) payload data using the same shared secret key "ncntestkey". The newly generated security stamp reads c3ca0a518c0409a100b3ae8c34c3d24c and is obviously different from the security stamp stored on the tag:

abb3d210756053027e9ad4d3b4b6b210

Note how a minimal change in the payload data makes the security stamp look entirely different. This is one of the main features of hash algorithms such as message digest five (MD.5 used for this purpose. Since the security stamps are different the system determines that the payload data has been tampered with between two checkpoints. Embodiments including generating security stamps as described herein are applicable to any types of supply chains or goods, but are particularly useful for health care applications, high-value goods logistics and life-cycle management.

Figure 10:
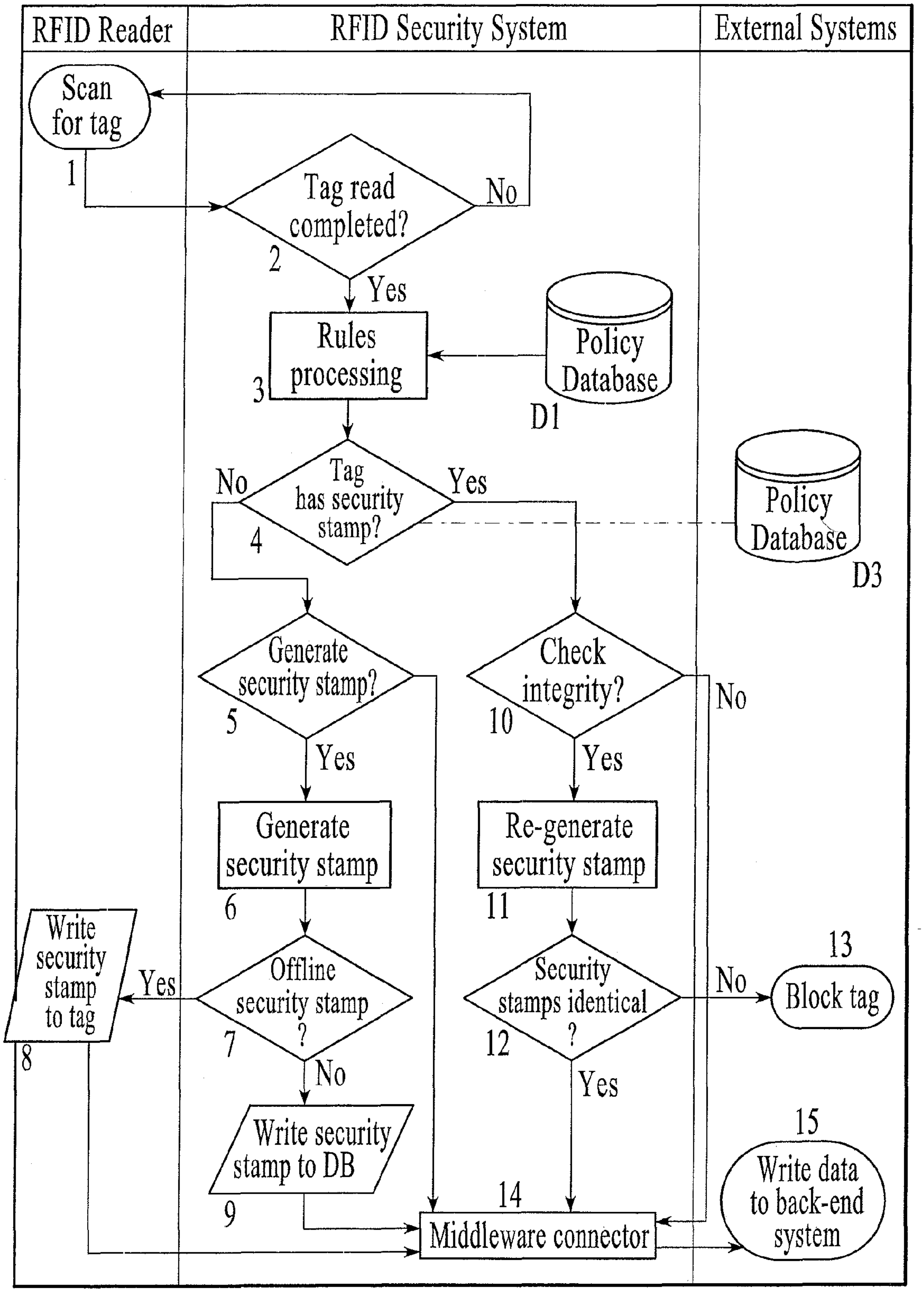
FIG. 10 is a flow diagram of an RFID security method including generating a signature, according to an embodiment.

FIG. 10 is a flow diagram of an RFID security method including generating a security stamp, according to an embodiment. The numbered paragraphs below describe similarly numbered elements of FIG. 10.

1. The RFID reader is scanning for RFID tags or transponders.

2. If a tag T is located in the reader field, the reader will read the tag identifier Tid (e.g. Electronic Product Code EPC) and the tag data TD. RFID tags come in many shapes and sizes but they all have in common that they carry a unique identifier and a user data block of varying length. Typically, the tag data TD consists of a consecutive block of binary data that can be addressed for reading and writing in chunks of 4 or 8 bytes (for example TD0x00-TD0xFE to address 1 kilobyte of data in chunks of 4 bytes). As soon as reading of the tag is complete, the tag data TD and the tag identifier Tid is passed to the RFID security system.

3. The RFID security system performs evaluation and processing of the rules in the policy database D1 as described above. Element (3) in this diagram represents the data flow described in the flow diagram of FIG. 5 (elements (3) through (10) of FIG. 5). If it was determined there that the tag data TD should be forwarded to the back-end systems, the RFID security system will continue with element (4) here.

4. The RFID security system checks if the tag T is already associated with a security stamp. A security stamp could be either stored directly inside the tag data TD or in a shared integrity database D3. If a security stamp is part of the tag data TD a configurable special code will be stored at a predefined location of the tag (for example code "0x00DEFA00" at address TD0xF3). If this code is found it is presumed that the tag data contains a security stamp at another predefined location (for example 16 consecutive bytes of data starting at address TD0xF4). The security stamp is extracted from the tag and made available to the RFID security system. If the tag does not contain a security stamp the integrity database D3 is queried for a security stamp. The RFID security system submits the tag's unique identifier Tid to the integrity database D3. If the integrity database can locate a security stamp for tag T this security stamp is made available to the RFID security system. If no security stamp was found the RFID security system continues with (5), otherwise the RFID security system continues with (10).

5. If the RFID security system's policy requires that a security stamp should be generated for tag T then the RFID security system will continue with (6), otherwise the RFID security system will continue with (14).

6. The RFID security system creates a security stamp for tag T. The security stamp S is calculated over the relevant area of the tag data TD using the standard HMAC-MD5 algorithm, in an embodiment. This results in a security stamp S consisting of 16 bytes of data. The standard HMAC-MD5 algorithm is given as just one example here. In various embodiments, the security stamp can be generated using any know algorithm or later-developed algorithms.

7. If the RFID security system is configured to store security stamps offline then the RFID security system continues with (8), otherwise the RFID security system continues with (9).

8. The RFID security system accesses the RFID reader/writer and stores the security stamp directly on the tag at a pre-configured location. The RFID security system continues with (14).

9. The RFID security system accesses the integrity database D3 and stores the security stamp S along with the unique tag identifier Tid there. The RFID security system continues with (14).

10. If the RFID security system is configured to verify security stamps the RFID security system continues with (11), otherwise the RFID security system continues with (14).

11. The RFID security system calculates a security stamp S2 for the tag.

12. The RFID security system compares the security stamp S2 calculated in (11) and the original security stamp S obtained in (4). If the security stamps are identical (S=S2) then this proves integrity of the tag data TD and the RFID security system continues with (14). Otherwise the RFID security system determines that the tag data TD has changed in transit as a result of fraud or error and the RFID security system continues with (13).

13. Processing for tag T ends here. Because the tag has been identified as counterfeit its contents will be discarded and never reach the back-end. The RFID security system continues with (2).

14. The RFID security system forwards the tag data TD to the middle-ware connector.

15. The middle-ware connector forwards the tag data TD to the associated back-end systems. The RFID security system continues with (2).

Aspects of the systems and methods described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the system include: microcontrollers with memory (such as electronically erasable programmable read only memory (EEPROM)), embedded microprocessors, firmware, software, etc. Furthermore, aspects of the system may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

It should be noted that the various functions or processes disclosed herein may be described as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.). When received within a computer system via one or more computer-readable media, such data and/or instruction-based expressions of components and/or processes under the system described may be processed by a processing entity (e.g., one or more processors) within the computer system in conjunction with execution of one or more other computer programs.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The above description of illustrated embodiments of the systems and methods is not intended to be exhaustive or to limit the systems and methods to the precise forms disclosed. While specific embodiments of, and examples for, the systems components and methods are described herein for illustrative purposes, various equivalent modifications are possible within the scope of the systems, components and methods, as those skilled in the relevant art will recognize. The teachings of the systems and methods provided herein can be applied to other processing systems and methods, not only for the systems and methods described above.

The elements and acts of the various embodiments described above can be combined to provide further embodiments. These and other changes can be made to the systems and methods in light of the above detailed description.

In general, in the following claims, the terms used should not be construed to limit the systems and methods to the specific embodiments disclosed in the specification and the claims, but should be construed to include all processing systems that operate under the claims. Accordingly, the systems and methods are not limited by the disclosure, but instead the scope of the systems and methods is to be determined entirely by the claims.

While certain aspects of the systems and methods are presented below in certain claim forms, the inventors contemplate the various aspects of the systems and methods in any number of claim forms. For example, while only one aspect of the systems and methods may be recited as embodied in machine-readable medium, other aspects may likewise be embodied in machine-readable medium. Accordingly, the inventors reserve the right to add additional claims after filing the application to pursue such additional claim forms for other aspects of the systems and methods.

What is claimed is:

1. A radio-frequency identification (RFID) tag security system, comprising:

a plurality of security servers each coupled between respective RFID tag reader devices and respective back-end systems, wherein a back-end system is configures to read tag data from and to write tag data to one or more RFID reader devices; and at least one database coupled to each security server, wherein the database is configurable to store a plurality of policies, and wherein each security server is configurable to analyze tag data read from and written to a respective tag reader device according to one or more of the policies, wherein analyzing comprises, determining whether the tag data has been tampered with and whether a tag is an unauthorized duplicate of a genuine, original tag;

generating a security stamp uniquely associated with the tag data;

storing the security stamp on or more of one the tag and an external integrity database, wherein under predefined circumstances when the tag data has been tampered with, an exception causes an escalation of priority, the predefined circumstances comprising a signature reference indicating an attack signature; and determining whether there is a security stamp associated with the tag data:

if there is a security stamp associated with the tag data, generating a second security stamp based on the tag data: and comparing the associated security stamp with the second security stamp to establish integrity of the associated tag data.

2. The system of claim 1, further comprising at least one integrity database coupled to the plurality of security servers and configured to store generated security stamps.

3. The system of claim 1, wherein each security server is further configurable to:

transmit the tag data to a respective back-end system when it is determined that the tag data has not been tampered with, and that the tag is nor an unauthorized duplicate of a genuine, original tag; and block the tag data from being transmitted to the respective back-end system when it is determined that the tag data has been tampered with, and that the tag is nor an unauthorized duplicate of a genuine, original tag.

4. The system of claim 1, wherein each security server is further configurable to store associated security stamp the RFID tag itself at a configurable area of tag user data along with a configurable code marking the tag as one that carries a security stamp.

5. The system of claim 1, wherein the back-end system comprises part of an enterprise and wherein the policies are preconfigured for the enterprise.

6. The system of claim 1, wherein the at least one database is further configurable to store attack pattern signatures, wherein analyzing the tag data comprises comparing attack pattern signatures to the tag data.

7. The system of claim 1, wherein each security server further comprises a front-end module configurable to receive interpret data from a plurality of RFID tag types.

8. The system of claim 1, wherein the at least one database is further configurable to store audit data comprising history information, including of results of analyzing the tag data.

9. The system of claim 1, wherein each security server further comprises a back-end module coupled to the back-end system, wherein the back-end module is configurable to transmit tag data output by the tag reader device to the back-end system, and wherein the back-end module is configurable to interface with a plurality of types of back-end systems.

10. A radio-frequency identification (RFID) tag security method, comprising:

receiving RFID tag data from an RFID tag reader device;

analyzing the tag data read from or written to a respective tag reader device, comprising determining whether the tag data has been tampered with and whether the tag is an unauthorized duplicate of a genuine, original tag;

if the tag data has not been tampered with, generating a security stamp uniquely associated with the tag data, and transmitting the tag data to a destination system and storing the security stamp on one or more of the tag and an external integrity database;

if the tag data has been tampered with, blocking the tag data from being transmitted to the destination system, wherein under predefined circumstances when the tag data has been tampered with, an exception causes an escalation of priority, the predefined circumstances comprising a signature reference indicating an attack signature and determining whether there is a security stamp associated with the tag data if there is a security stamp associated with the tag data, generating a second security stamp based on the tag data; and comparing the associated security stamp with the second security stamp to establish integrity of the associated tag data.

11. The method of claim 10, wherein the destination system comprises an enterprise back-end system.

12. The method of claim 10, further comprising storing the associated security stamp on at least one of an associated RFID tag and an integrity database.

13. The method of claim 10, wherein analyzing the data further comprises comparing attack pattern signatures to the tag data.

14. The method of claim 10, wherein analyzing further comprises analyzing according to one or more predetermined policies.

15. The method of claim 14, wherein the predetermined policies comprise a plurality of rules, and wherein analyzing further comprises evaluating a first rule to determine whether the first rule is applicable.

16. The method of claim 15, further comprising, if the first rule is applicable, processing the first rule.

17. The method of claim 15, further comprising, if the first rule is not applicable, evaluating a next rule to determine whether the next rule is applicable.

18. The method of claim 17, further comprising, if the next rule is applicable, processing the next rule.

19. The method of claim 18, further comprising, if none of the plurality of rules is applicable, processing a default rule.

20. The method of claim 10, wherein analyzing the tag data comprises processing at least one of a plurality of predetermined rules.

21. The method of claim 10, further comprising storing results of the analysis in an audit database.

22. A computer-readable medium, comprising a non-transitory media, having stored thereon instructions, that when executed in a system cause a radio-frequency identification (RFID) tag security method to be performed, the method comprising:

receiving RFID tag data from an RFID tag reader device;

analyzing the tag data read from or written to a respective tag reader device, comprising determining whether the tag data has been tampered with and whether the tag is an unauthorized duplicate of a genuine, original tag;

if the tag data has not been tampered with, generating a security stamp uniquely associated with the tag data, and transmitting the tag data to a destination system and storing the security stamp on one or more of the tag and an external integrity database; and if the tag data has been tampered with, blocking the tag data from being transmitted to the destination system, wherein under predefined circumstances when the tag data has been tampered with, an exception causes an escalation of priority, the predefined circumstances comprising a signature reference indicating an attack signature and determining whether there is a security stamp associated with the tag data;

if there is a security stamp associated with the tar data, generating a second security stamp based on the tag data; and comparing the associated security stamp with the second security stamp to establish integrity of the associated tag data.

23. The computer-readable medium of claim 22, wherein the destination system comprises an enterprise back-end system.

24. The computer-readable medium of claim 22, wherein the method further comprising storing the associated security stamp on at least one of an associated RFID tag and an integrity database.

25. The computer-readable medium of claim 22, wherein analyzing the data further comprises comparing attack pattern signatures to the tag data.

26. The computer-readable medium of claim 22, wherein analyzing further comprises analyzing according to one or more predetermined policies.

27. The computer-readable medium of claim 26, wherein the predetermined policies comprise a plurality of rules, and wherein analyzing further comprises evaluating a first rule to determine whether the first rule is applicable.

28. The computer-readable medium of claim 22, wherein the method further comprises, if the first rule is applicable, processing the first rule.

29. The computer-readable medium of claim 22, wherein the method further comprises, if the first rule is not applicable, evaluating a next rule to determine whether the next rule is applicable.

30. The computer-readable medium of claim 29, wherein the method further comprises, if the next rule is applicable, processing the next rule.

31. The computer-readable medium of claim 30, wherein the method further comprises, if none of the plurality of rules is applicable, processing a default rule.

32. The computer-readable medium of claim 22, wherein analyzing the tag data comprises processing at least one of a plurality of predetermined rules.

33. The computer-readable medium of claim 22, wherein the method further comprises storing results of the analysis in an audit database.

34. The computer-readable medium of claim 22, wherein the method further comprises storing escalating the results of the analysis when the tag data is determined not to be secure.

35. A radio-frequency identification (RFID) tag security system, comprising:

a plurality of security servers each coupled between respective RFID tag reader devices and respective back-end systems, wherein a back-end system is configures to read tag data from and to write tag data to one or more RFID reader devices; and at least one database coupled to each security server, wherein the database is configurable to store a plurality of policies, and wherein each security server is configurable to analyze tag data read from and written to a respective tag reader device according to one or more of the policies, wherein analyzing comprises, determining whether the tag data has been tampered with and whether a tag is an unauthorized duplicate of a genuine, original tag;

generating a security stamp uniquely associated with the tag data, wherein generating a security stamp comprises calculating a unique hash value over tag data utilizing standard cryptographic hash functions, comprising hash-based message algorithm code-message direst five (HMAC-MD5), hash-based message algorithm code-secure hash algorithm one (HMAC-SHA-1), wherein tag data comprises tag user data, payload data, and factory pre-set tag meta data, including an unchangeable unique tag identification number;

storing the security stamp on or more of one the tag and an external integrity database, wherein under predefined circumstances when the tag data has been tampered with, an exception causes an escalation of priority, the predefined circumstances comprising a signature reference indicating an attack signature; and determining whether there is a security stamp associated with the tag data:

if there is a security stamp associated with the tag data, generating a second security stamp based on the tag data: and comparing the associated security stamp with the second security stamp to establish integrity of the associated tag data.

36. The system of claim 2 wherein a mismatch between the associated security stamp and the second security stamp is interpreted as one or more of, unauthorized tag user data manipulation, unauthorized tag user data duplication due to unavoidable tag meta data changes when copying tag user data from one physical tag to another; and unauthorized manipulation of a security stamp stored on the tag.

* * * * *